Patented June 3, 1941

2,244,655

UNITED STATES PATENT OFFICE 2,244,655

VAT DYESTUFFS OF THE ANTHRAQUINONE SERIES

Hans Schlichenmaier and Ludwig Wilhelm Berlin, Frankfort - on - the - Main, and Erich Berthold, Ludwigshafen-on-the-Rhine, Germany, assignors to General Aniline & Film Corporation, a corporation of Delaware No Drawing. Application February 4, 1939, Serial No. 254,538. In Germany February 9, 1938

8 Claims. (Cl. 260—303)

The present invention relates to new vat dyestuffs of the anthraquinone series.

We have found that anthraquinone azoles corresponding to the general formula

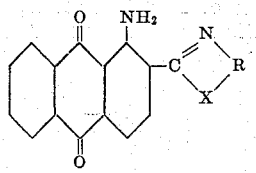

wherein R stands for the radical of an anthraquinone, X for a member selected from the group consisting of —O— and —S—, the linkages from N and X to R leading to two neighbouring positions of R and containing in one of the alpha positions of the anthraquinonyl radical shown the group

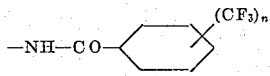

$n$ being an integer up to 2, are valuable vat dyestuffs.

A suitable method for preparing the said dyestuffs consists in causing an aminoanthraquinone azole corresponding to the general formula

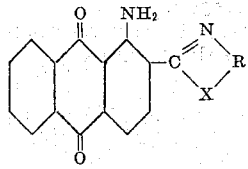

wherein R and X have the meanings mentioned above and which contains in one of the alpha positions of the anthraquinonyl radicle an amino group, to react in the usual manner with an omega-trifluormethylarylcarboxylic acid halide, for instance by heating the reaction components in a solvent of high boiling point such as nitrobenzene, trichlorbenzene and the like.

The new dyestuffs are distinguished by their valuable tinctorial properties, especially by their clear tint and their excellent fastness to light.

The following examples will further illustrate how the said invention may be carried out in practice, but the invention is not restricted to these examples. The parts are by weight.

1. 20 parts of 1-4-diamino-2-anthraquinonyl-2'-3'-anthraquinone-oxazole (prepared as indicated in Example 1 of German Patent No. 623,-028) in 400 parts of nitrobenzene are heated, within the course of 4 hours to 190° C.–200° C., together with 20 parts of meta-ω-trifluoromethylbenzoylfluoride and the whole is kept at this temperature until hydrogen fluoride is no longer evolved and no parent material can be detected. The dyestuff which separates in the form of blue needles is isolated by filtering with suction, while hot; it is then washed until free from nitrobenzene and dried. The yield is very good.

The 1-amino-4-meta-ω-trifluoromethylbenzoylamino - 2 - anthraquinonyl-2'-3'-anthraquinone-oxazole thus obtained is a blue-red crystalline powder having a metallic luster; it dissolves in concentrated sulfuric acid to a yellow-olive solution and dyes vegetable fiber, in a violet vat, intense, clear, reddish-blue tints which are very fast to chlorine and to light.

If para-ω-trifluoromethylbenzoyl fluoride is used, the corresponding para-ω-trifluoromethylbenzoyl derivative having similar properties is obtained in the same manner.

2. 20 parts of 1-4 diamino-2-anthraquinonyl-2'-3'-anthraquinone-thiazole (obtainable as indicated in Example 11 of German Patent No. 623,028) in 300 parts of nitrobenzene are treated, together with 18 parts of meta-ω-trifluoromethylbenzoyl fluoride, as indicated in Example 1. The 1-amino-4-meta-ω-trifluoromethylbenzoylamino - 2 - anthraquinonyl-2'-3'-anthraquinone-thiazole, which is thus obtained with a practically quantitative yield in the form of blue-red needles having a metallic luster, dissolves in concentrated sulfuric acid to an olive-green solution and dyes cotton, in a violet vat, clear, intense, greenish-blue tints having very good properties of fastness.

When the ortho-ω-trifluoromethylbenzoyl fluoride is used instead of the meta-derivative, a dyestuff having similar properties is obtained.

3. 50 parts of 1-4-diamino-2-anthraquinonyl-1'(N) - 2'(O) - anthraquinone - oxazole obtainable as indicated in Example 5 of German Patent 623,028) in 1000 parts of nitrobenzene are slowly heated to 200° C., together with 50 parts of meta-ω-trifluoromethylbenzoyl fluoride and 0.5 part of pyridine and the whole is kept at this temperature until the blue crystals of the 4-meta-ω-trifluoromethylbenzoylamino-derivative are formed. The whole is filtered with suction, while hot, and the residue is worked up as described above. The dyestuff dissolves in concentrated sulfuric acid to a yellow solution and dyes vegetable fiber, in a red-violet vat, reddish-blue tints.

4. 25 parts of 1-5-diamino-2-anthraquinonyl-2'-3'-anthraquinone-oxazole (prepared as indicated in Example 4 of German Patent No. 623,028) in 500 parts of nitrobenzene are heated at 180° C.–200° C., together with 20 parts of meta-ω-trifluoromethylbenzoyl fluoride, until hydrogen fluoride is no longer evolved and no parent material can be detected. After working up as described above, the dyestuff is obtained, with a good yield, in the form of blue-red crystals having a metallic luster which dissolve in concentrated sulfuric acid to a yellow solution and dye cotton, in a dark violet vat, clear, intense ruby-red tints having very good properties of fastness.

Dyestuffs having similar properties are obtained from an ω-trifluoromethylbenzoyl halide and 1-5-diamino-2-anthraquinonyl-1'(N)-2'(O)-anthraquinone-oxazole.

5. 25 parts of 1-4-diamino-2-anthraquinonyl-1'(S)-2'(N)-anthraquinone-thiazole (obtainable for example by condensing 1-amino-4-nitroanthraquinone-2-carboxylic acid chloride with 1-chlor-2-amino-anthraquinone, heating the 1-amino-4-nitroanthraquinone-2-carbonyl-2'-amino-1'-chloranthraquinone thus obtained with sodium sulfide and sulfur in pyridine to form 1.4-diaminoanthraquinone-2-carbonyl-2'-amino-1'-mercapto-anthraquinone whereupon the ring closure is effected by heating it in concentrated sulfuric acid at about 100° C.) in 400 parts of nitrobenzene are heated at 180° C.-200° C. together with 20 parts of meta-ω-trifluoromethyl-benzoyl fluoride, until the formation of the dyestuff is at an end. The dyestuff which is obtained in the form of reddish blue crystals having a metallic luster dissolves in concentrated sulfuric acid to a yellow-olive solution and yields, in a reddish violet vat, clear, fast blue tints.

Dyestuffs having similar properties are obtained by causing an ω-trifluoromethylbenzoyl halide to act upon 1-4-diamino-2-anthraquinonyl-1'(N)-2'(S)-anthraquinone-thiazole, obtained, for instance by the process of German Patent No. 623,028, from 1-amino-4-nitro-anthraquinone-2-carboxylic acid chloride and 1-amino-2-mercapto-anthraquinone.

We claim:

1. Vat dyestuffs of the anthraquinone series corresponding to the formula

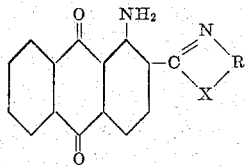

wherein R stands for the radical of an unsubstituted anthraquinone, X for a member selected from the group consisting of —O— and —S—, the linkages from N and X to R leading to neighboring positions of R, and containing in one of the alpha positions of the amino-anthraquinonyl radical the group

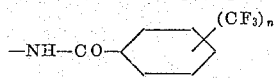

$n$ being an integer up to 2, the other positions being occupied by hydrogen.

2. Vat dyestuffs of the anthraquinone series corresponding to the formula

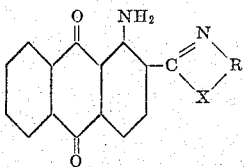

wherein R stands for the radical of an unsubstituted anthraquinone, X for a member selected from the group consisting of —O— and —S—, the linkages from N and X to R leading to neighboring positions of R, and containing in one of the alpha positions of the amino-anthraquinonyl radical the group

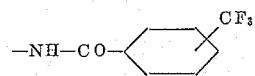

the other positions being occupied by hydrogen.

3. Vat dyestuffs of the anthraquinone series corresponding to the formula

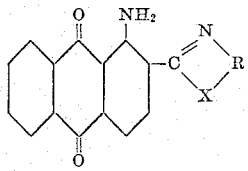

wherein R stands for the radical of an unsubstituted anthraquinone, X for a member selected from the group consisting of —O— and —S—, the linkages from N and X to R leading to neighboring positions of R, and containing in one of the alpha positions of the amino-anthraquinonyl radical the group

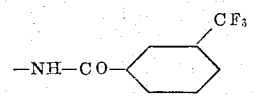

the other positions being occupied by hydrogen.

4. The vat dyestuffs of the anthraquinone series corresponding to the formula

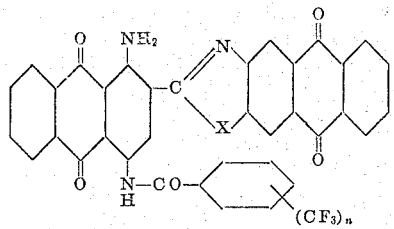

wherein X stands for a member selected from the group consisting of —O— and —S— and $n$ for an integer up to 2, the other positions being occupied by hydrogen.

5. The vat dyestuff of the anthraquinone series corresponding to the formula

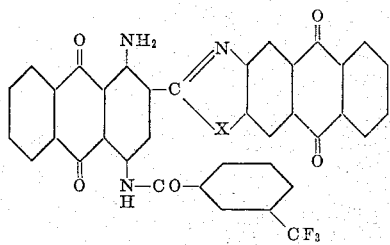

wherein X stands for a member selected from the class consisting of —O— and —S—, the other positions being occupied by hydrogen.

6. The vat dyestuff of the formula

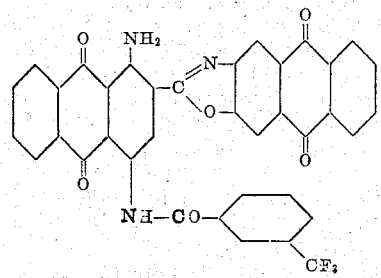

which dyes from a violet vat vegetable fibers clear reddish blue shades of very good fastness to chlorine, washing and light.

7. The vat dyestuff of the formula

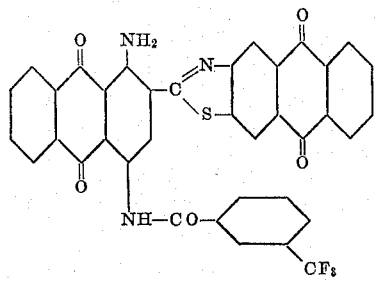

which dyes from a violet vat vegetable fibers clear greenish blue shades of very good fastness to chlorine, washing and light.

8. The vat dyestuff of the formula

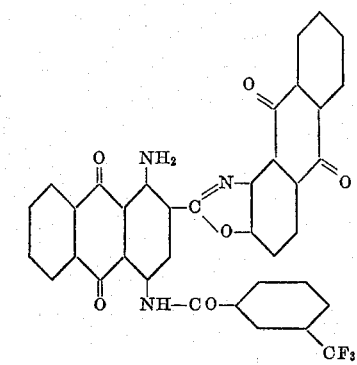

which dyes from a redviolet vat vegetable fibers blue shades of very good fastness to chlorine, washing and light.

HANS SCHLICHENMAIER.
LUDWIG WILHELM BERLIN.
ERICH BERTHOLD.